Dec. 9, 1941.    J. E. KLINE    2,265,377
ENCASED ABRASIVE ELEMENT
Filed May 22, 1939    2 Sheets-Sheet 1
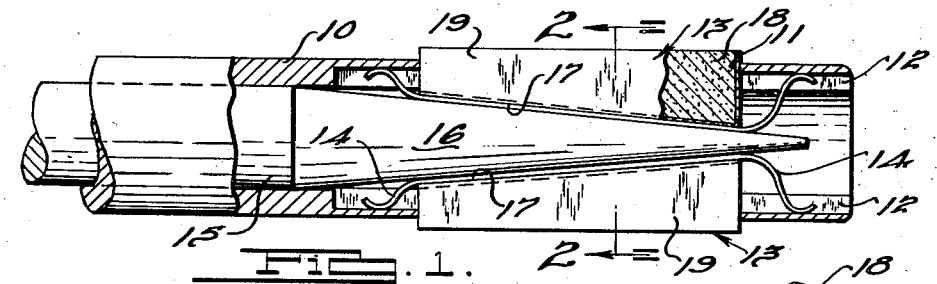
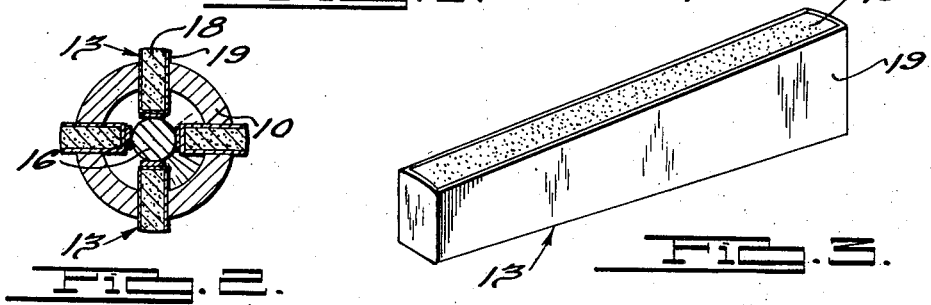
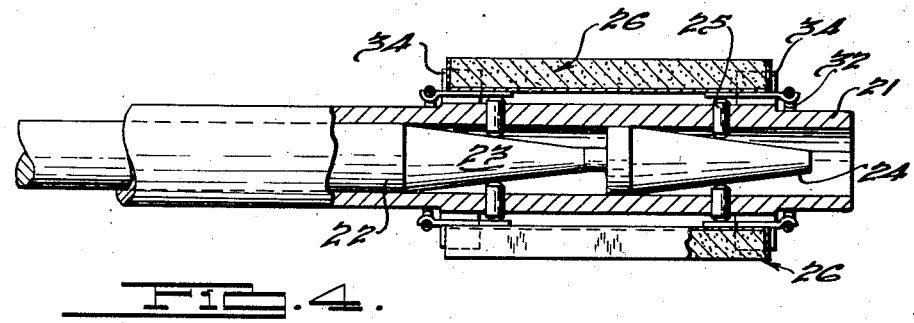
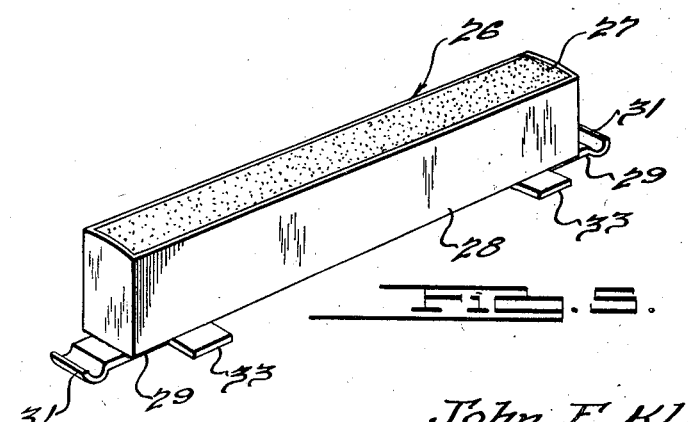
INVENTOR
John E. Kline.
BY Harness, Dickey & Pierce.
ATTORNEYS.

Dec. 9, 1941.   J. E. KLINE   2,265,377
ENCASED ABRASIVE ELEMENT
Filed May 22, 1939   2 Sheets-Sheet 2
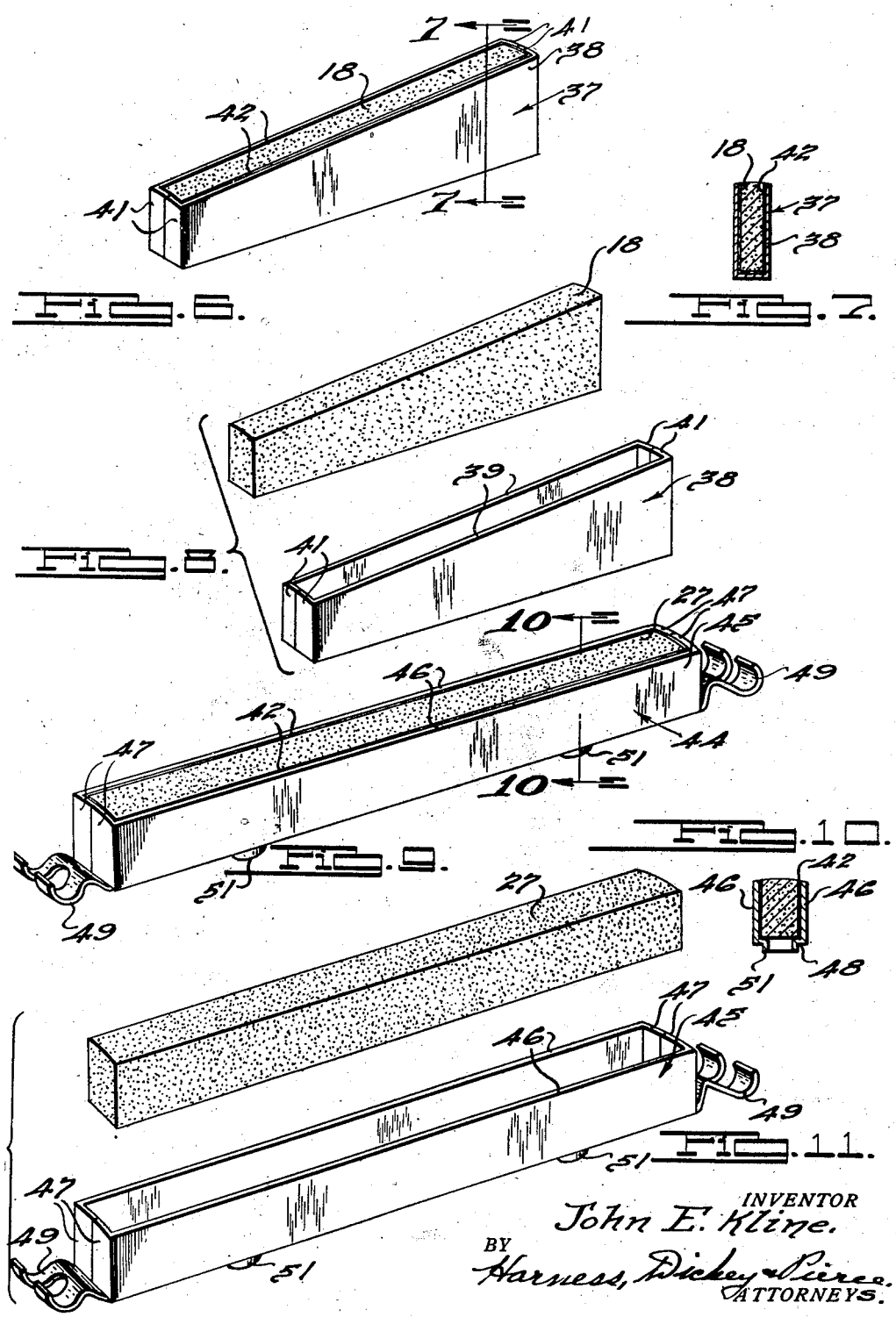
INVENTOR
John E. Kline.
BY Harness, Dickey & Pierce.
ATTORNEYS.

Patented Dec. 9, 1941

2,265,377

UNITED STATES PATENT OFFICE 2,265,377

ENCASED ABRASIVE ELEMENT

John E. Kline, Grosse Pointe Farms, Mich., assignor to Micromatic Hone Corporation, Detroit, Mich., a corporation of Michigan Application May 22, 1939, Serial No. 274,889

2 Claims. (Cl. 51—184.3)

My invention relates to honing elements and methods, and particularly to the abrading stones thereof which are reinforced and supported by a metal sheath secured thereon in a new and novel manner.

Heretofore, the abrading elements, such as honing sticks for tools, had the base portion thereof encased in a holder to provide a support for the resulting unit structure. In some instances, the holders were machined from bar stock to provide a channel recess into which the stone was bonded by Babbitt or like metal which wedged the stone within the channel. In other instances, metal stampings of channel shape were formed to which the abrading element was secured by a glue-like substance. In other instances, holders were constructed having clamps which secured the stone by pressure applied by the clamp. In still other instances, dovetails were provided which mated with dovetailed slots in holders for retaining the stones in fixed relation therewith.

In practicing one phase of my present invention, I bond a metal sheath onto the stone by employing a process which provides an intimate physical bond of metal with the abrading material. This is accomplished by a spray, a plating, or other similar method which applies particles of metal to the surface of a stone and builds up such particles to form a sheath of substantial strength. The sheath thus formed on the abrading stone provides material strength thereto and at the same time produces a surface to which elements may be attached by soldering, brazing, welding, or the like. In another phase, the sheath is stamped from metal and formed to encompass all but the working face of abrading element and securely connected thereto.

Accordingly, the main objects of my invention are: to provide an abrading stone with a sheath of metal intimately bonded thereto; to build up a sheath on abrading stones by applying a plurality of metal particles to the stone and to each other to form a solid surface of metal; to provide a method of forming a sheath of metal on an abrading stone which employs a plating process; to provide a metal sheath intimately adhered to an abrading stone by a metal spraying process; to form an abrading element by providing an intimate metal sheath on an abrading stone and soldering, brazing, welding or otherwise securing appendages thereto which cooperate with its support on a tool; and in general to provide an intimate sheath on an abrading stone by a method which is simple and economical of application.

Other objects and features of novelty of my invention will be either specifically pointed out or will become apparent when referring, for a better understanding of my invention, to the following description taken in conjunction with the accompanying drawings wherein:

Figure 1 is a broken sectional view of a honing head illustrating an abrading stone embodying features of my invention;

Figure 2 is a sectional view of structure illustrated in Figure 1, taken on the line 2—2 thereof;

Figure 3 is an enlarged perspective view of an abrading element, similar to that illustrated in the tool of Figure 1;

Figure 4 is a sectional view of an abrading tool, similar to that illustrated in Figure 1, showing a modified form thereof; and Fig. 5 is an enlarged perspective view of an abrading stone illustrated in the tool of Fig. 4;

Fig. 6 is a perspective view of an abrading element, similar to that illustrated in Fig. 3, showing a further form which my invention may assume;

Fig. 7 is a sectional view of structure illustrated in Fig. 6, taken on the line 7—7 thereof;

Fig. 8 is an exploded view of the abrasive stone and supporting casing illustrated in Fig. 6;

Fig. 9 is a perspective view of an abrading element showing a still further form which my invention may assume;

Fig. 10 is a sectional view of the structure illustrated in Fig. 9, taken on the line 10—10 thereof; and Fig. 11 is an exploded view of the abrasive stone and casing illustrated in combination in Fig. 9.

Abrading elements, such as honing sticks for expandable types of honing bodies, have had their base portion supported in a retaining element by the application of Babbitt, cements, and the like. The ends and sides of the abrading elements were unsupported and when such elements were employed, as in a honing operation for a cylinder, the leading edge of the stone was subjected to a force in compression while the trailing edge was subjected to a tension strain. As is well known in the abrasive industry, an abrasive stone will withstand material compression pressure while on the other hand, such elements are very weak when subjected to a tensional strain. As a result, the trailing edge of abrasive sticks, such as those employed in a honing tool, crumbled very rapidly, decreasing the width of the stick and finally rendering it unsuitable for an abrasive operation.

The present invention contemplates encasing the entire abrasive element in a metal sheath of sufficient thickness to provide strength and support to the abrasive edges, particularly the trailing edge which is subjected to the tensional strain. The material of the sheath is preferably made of non-ferrous material which is relatively soft, or a very soft ferrous material could be utilized. Such material will be abraded away without marring the cylinder wall as the surface of the abrasive stick wears. The edge of the sheath, being in intimate contact with the wall, functions as a wiper to prevent any abrasive material from being picked up by the abrasive stick, which would produce heavy scratch marks in the face of the cylindrical surface. When such a sheath is built up on the stone by a spraying, electroplating, or like operation, a satisfactory bond is provided between the sheath and stone to produce the desired support. When the sheath is formed from a sheet of metal bent to predetermined form, a suitable cement provides the bond between the sheath and abrasive stone which produces the necessary support to the stone edges. The sheath may be formed into the shape of a rectangular casing for encompassing the stone, and such casing may be provided with projecting supporting ends as well as positioning projections employed for retaining the casing fixed to a radially movable shoe of a tool.

Referring to Fig. 1, an abrading end of a honing tool is illustrated embodying a body portion 10 having diametrically disposed slots 11 therein and internally aligned channels 12. Abrading stones 13 project through the slots 12 and are biased inwardly by a spring strip 14, the ends of which project within the channels 12. An adjusting rod 15 is axially movable within the body 10 and provided with a tapered end 16 which engages the sloping surfaces 17 of the abrading stones 11.

The movement of the adjusting rod 15 to the right moves the abrading stones 13 outwardly of the tool while the reverse movement of the rod permits the spring 14 to move the stones toward the axis of the tool body.

In Fig. 3, I have illustrated a stone 13 as embodying an abrading stick 18 having on the back and sides a metal sheath 19 composed of metal particles accumulated thereon by metal spraying, electroplating, or other similar processes. An intimate adhesion of the metal particles occurs with the particles of the abrading stick and with each other. With my process, any thickness of sheath may be formed on the abrading stick with a resulting increase in strength, which reduces the losses due to breakage and prevents too rapid breaking down of the stone edges which thereby increases the useful life of the stone. The sheath may directly contact the tapered end 16 of the adjusting rod 15 for moving the sticks radially and various elements may be soldered, brazed, welded, or otherwise secured to the sheath to provide the necessary appendages.

In Fig. 1, I have illustrated the spring 14 which may be wire or strap material secured to the rear surface of the sheath of the abrasive elements 13 to have the ends project therefrom for the purpose of biasing the abrasive elements toward the tool body axis.

In Fig. 4, I have illustrated a similar tool having a body portion 21 through which a push rod 22 is axially movable having a pair of cones 23 and 24 thereon. The cones operate pins 25 which project through the wall of the body 21 and contact the abrading elements 26. The elements 26, as illustrated in Fig. 5, embody an abrading stick 27 having a sheath of metal 28 thereon provided in the manner above outlined. The elements 29 are soldered, brazed, or welded to the under side of the sheath of the stick having hooked ends 31 in which garter springs 32 may be disposed to provide inward bias to the abrading elements. The elements 29 may embody side projecting portions 33 which position the stones on the body against longitudinal movement relative to slotted spiders 34 on the body.

In Figs. 6, 7, and 8, I have illustrated a sheathed stone 37, similar in appearance to that of Fig. 3, with the exception that the sheath 38 thereof is a separate element as illustrated in Fig. 8. The sides 39 of the sheath are bent inwardly to provide end portions 41 which when folded encompass the end face of the abrasive stone 18. A cement 42 binds the stone 18 to the sheath 38 on all but its top exposed face. The edges of the sheath are dressed to be in the arcuate plane of the face and are preferably made of material much softer than the material of the element having its surface machined.

In Figs. 9 and 10, and 11, a similar abrasive element 44 is illustrated having the sheath 45 thereof formed with the side walls 46 bent inwardly at the ends at 47 to encompass the side and end faces of the abrasive element 27. The base 48 of the sheath 44 is extended at the ends and formed into the hooks 49 which receive the garter springs of the tool as illustrated in Fig. 4 for supporting the stone on the tool body. The base 48 is further provided with projecting portions 51 by which the sheath and stone is retained against longitudinal movement in a radially movable element of the tool body. A cement 42 likewise bonds all but the exposed face of the stone to the sheath at the sides, base, and ends thereof.

While I have illustrated a method of sheathing abrasives when applied to abrading sticks for honing tools, it is to be understood that the invention is not intended to be so limited. The application of particles of metal on the abrasive surface of any element, which multiply on each other to form a solid sheath and the bonding of a separately formed sheath to an abrading stone to strengthen the resulting abrading structure, comes within the purview of my invention. The metal which is employed in the spraying, electroplating, or similar processes, and the sheet material is preferably soft, such as copper, brass, silver, and the like, which wears away during an abrading operation without scratching or marring the surface being operated upon by the tool. In other words, the side walls of the abrading elements wear away as the abrading operations progress so that the strength provided to the stone is maintained throughout the stone life. The sheath prevents the crumbling of the edges and the weakening of the stones as occured when such edges were unsupported. After the electroplating, spraying, or similar method has produced the predetermined thickness of metal to the sheath, its surface is preferably burnished or otherwise machined to provide a smooth finish and a predetermined dimension to the resulting abrading element. The built-up sheath thus provided may be supported by the wall of the tool or appendages may be soldered, brazed, welded, or otherwise secured thereto by which the abrading element is retained in the device and actuated. Similarly, the sheath constructed from the sheet material may be formed to embody the necessary appendages.

While I have described and illustrated but two embodiments of my invention, it will be apparent to those skilled in the art that various changes, omissions, additions, and substitutions may be made therein without departing from the spirit and scope of my invention, as set forth in the accompanying claims.

I claim as my invention:

1. In a honing tool having longitudinally extending abrasive stones, a cam element for moving said stones radially, each of said stones having a relatively soft sheet metal sheath enclosing said stones and overlying the entire surface thereof except the longitudinally extending working face, the metal on the side opposite to the working face being engaged directly by said cam, and the edge of the metal at the sides intersecting the working face being flush therewith and adapted to engage the surface to be honed.

2. In a honing tool having longitudinally extending removable abrasive stones, a cam element for moving said stones radially, each of said stones having a relatively soft sheet metal sheath overlying and bonded to the entire surface of said stones except the longitudinally extending working face, the metal on the side opposite the said working face being directly engaged by said cam, and the edge of the metal at the sides intersecting the working face being flush therewith and adapted to engage the surface to be honed.

JOHN E. KLINE.